US 8,078,736 B1
(12) United States Patent
Hannel et al.

(10) Patent No.: US 8,078,736 B1
(45) Date of Patent: *Dec. 13, 2011

(54) VIRTUAL INTERFACE

(75) Inventors: Clifford Hannel, Thousand Oaks, CA (US); Marcel F. Desdier, Calabasas, CA (US); Jan Olderdissen, Thousand Oaks, CA (US)

(73) Assignee: IXIA, Calabasas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/196,708

(22) Filed: Aug. 2, 2011

Related U.S. Application Data

(63) Continuation of application No. 10/608,491, filed on Jun. 27, 2003, now Pat. No. 8,005,958.

(51) Int. Cl.
*G06F 15/167* (2006.01)
(52) U.S. Cl. .......... 709/227; 709/230; 709/206
(58) Field of Classification Search .......... 709/227, 709/230, 208, 203, 244
See application file for complete search history.

(56) References Cited

U.S. PATENT DOCUMENTS

| | | | |
|---|---|---|---|
| 5,027,343 A | 6/1991 | Chan et al. | |
| 5,600,632 A | 2/1997 | Schulman | |
| 5,761,486 A | 6/1998 | Watanabe | |
| 5,764,639 A | 6/1998 | Staples et al. | |
| 5,974,463 A | 10/1999 | Warrier et al. | |
| 6,041,042 A | 3/2000 | Bussiere | |
| 6,157,955 A | 12/2000 | Narad et al. | |
| 6,172,989 B1 | 1/2001 | Yanagihara et al. | |
| 6,173,333 B1 | 1/2001 | Jolitz | |
| 6,173,399 B1 | 1/2001 | Gilbrech | |
| 6,263,363 B1 | 7/2001 | Rosenblatt et al. | |
| 6,377,571 B1 | 4/2002 | Tai | |
| 6,414,958 B1 | 7/2002 | Specht | |
| 6,446,121 B1 | 9/2002 | Shah | |
| 6,483,840 B1 | 11/2002 | Vogel | |
| 6,519,254 B1 | 2/2003 | Chuah | |
| 6,557,037 B1 | 4/2003 | Provino | |
| 6,631,416 B2 | 10/2003 | Bendinelli | |
| 6,675,218 B1 | 1/2004 | Mahler et al. | |
| 6,804,777 B2 | 10/2004 | Hollis | |
| 6,894,999 B1 | 5/2005 | Acharya | |
| 6,895,443 B2 | 5/2005 | Aiken | |
| 7,124,189 B2 | 10/2006 | Summers | |
| 7,152,119 B2 | 12/2006 | Na | |
| 7,181,542 B2 | 2/2007 | Tuomenoksa | |
| 7,242,665 B2 | 7/2007 | Langille et al. | |
| 7,366,147 B2 | 4/2008 | O'Neill | |
| 7,366,182 B2 | 4/2008 | O'Neill | |

(Continued)

OTHER PUBLICATIONS

Alessandro Rubini, Gearheads Only: Virtual Interfaces, Linux Magazine, Apr. 2000.

(Continued)

*Primary Examiner* — Kevin Bates
(74) *Attorney, Agent, or Firm* — SoCal IP Law Group LLP; Steven C. Sereboff; Mark A. Goldstein

(57) ABSTRACT

A virtual interface is disclosed. A method may include allowing upper layer software to transparently access the capabilities of a network device via a virtual interface as if the network device were in a computing device in which the upper layer software is resident. A communication channel may be established with a computing device. A virtual interface to a network device in the computing device is created. Incoming data units directed to the network device are received via the communication channel, and are made available via the virtual interface. Outgoing data units directed to the virtual interface may be forwarded to the network device via the communication channel. The methods may be implemented on computing devices that include network cards, including computers and/or network testing systems.

17 Claims, 8 Drawing Sheets

U.S. PATENT DOCUMENTS

| | | |
|---|---|---|
| 7,379,465 B2 | 5/2008 | Aysan et al. |
| 7,391,739 B1 | 6/2008 | Taylor et al. |
| 7,400,586 B2 | 7/2008 | Izundu et al. |
| 7,440,415 B2 | 10/2008 | Wild et al. |
| 7,447,622 B2 | 11/2008 | Arama et al. |
| 7,561,559 B2 | 7/2009 | Hannel et al. |
| 7,606,939 B1 | 10/2009 | Finn |
| 7,710,867 B1 | 5/2010 | Masters |
| 2002/0191649 A1 | 12/2002 | Woodring |
| 2003/0018804 A1 | 1/2003 | Laxman |
| 2003/0043434 A1 | 3/2003 | Brachmann et al. |
| 2004/0141468 A1 | 7/2004 | Christensen |
| 2004/0240440 A1 | 12/2004 | Wild et al. |
| 2005/0163123 A1 | 7/2005 | Gangadharan |
| 2006/0031407 A1 | 2/2006 | Dispensa et al. |
| 2007/0025261 A1 | 2/2007 | Ginsberg et al. |

OTHER PUBLICATIONS

Marko Zec, Network Stack Cloning/Virtualization Extensions to the Free BSD Kernel, webiste: http://www.tel.fer.hr/zec/vimage/, accessed Sep. 8, 2003.

Marko Zec, BSD Network Stack Virtualization, BSDCon Europe, Amsterdam, Nov. 2002.

Olaf Titz, CIPE—FAQ, website: http://sites.inka.de/sites/bigred/devel/cipe-faq.html, accessed Aug. 3, 2004.

Olaf Titz, CIPE—Crypto IP Encalpsulation, website: http://sites.inka.de/sites/bigred/devel/cipe.html, accessed Aug. 4, 2004.

P.B. Danzig and S. Jamin, TCPLIB: A Library of TCP Internetwork Traffic Characteristics, BNSDocID XP0992284246, 1991.

Unknown, Virtual Interface MIB, Cisco MDS 9000 Family MIB Reference Guide, Release 1.01 (1), Feb. 4, 2003.

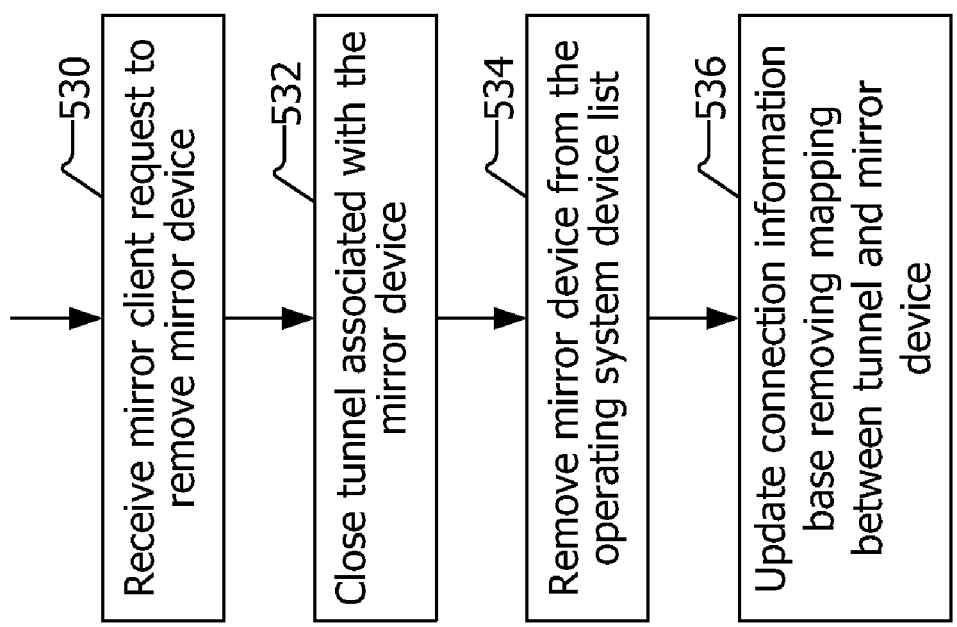

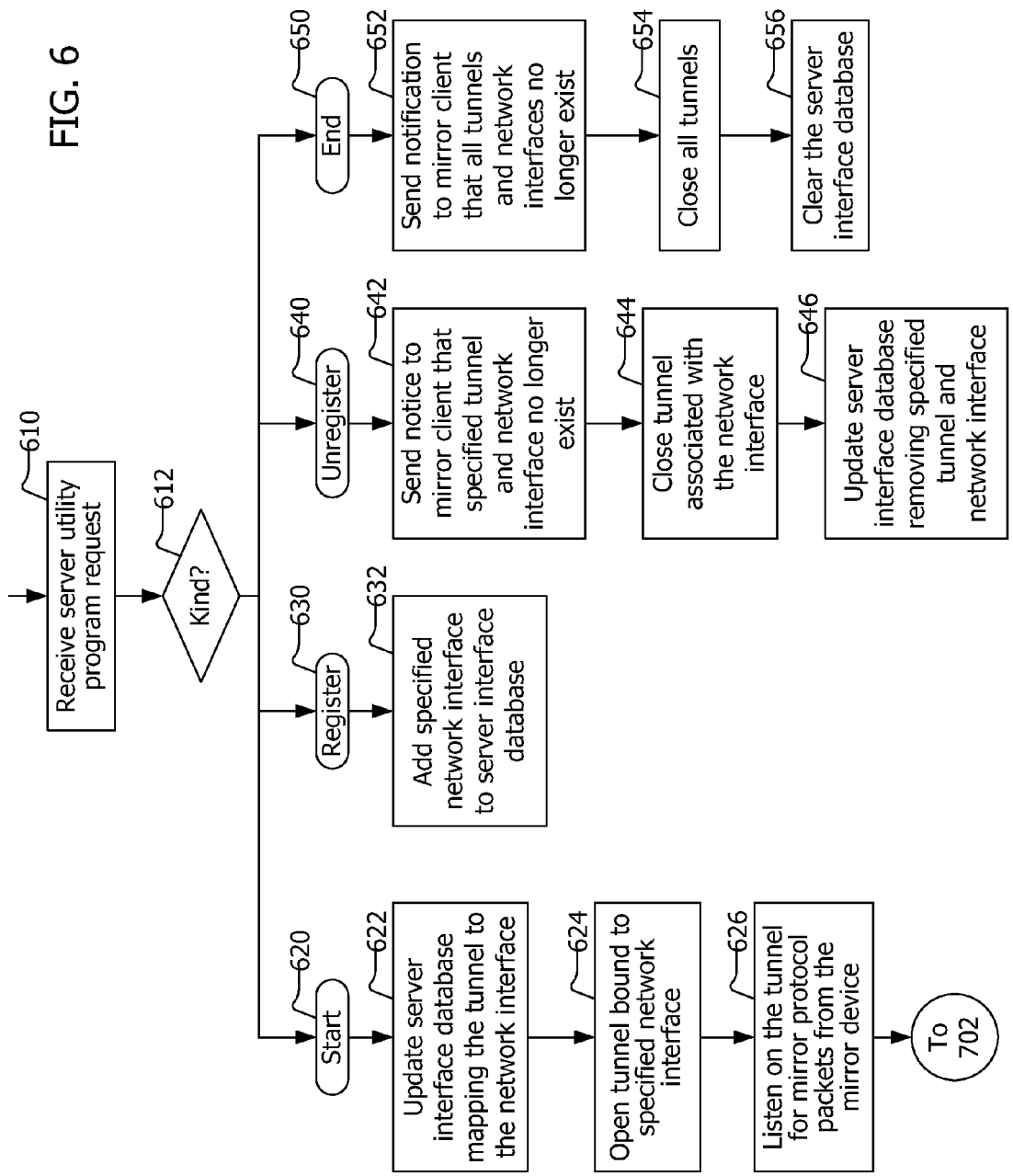

VIRTUAL INTERFACE

RELATED APPLICATION INFORMATION

This patent claims priority from Utility patent application Ser. No. 10/608,491 filed Jun. 27, 2003, entitled "VIRTUAL INTERFACE", which is incorporated herein by reference.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND OF THE INVENTION

1. Field of the Invention

The invention relates to testing and analysis of communications networks, systems and devices, and, applications that run thereon.

2. Description of Related Art

Networks such as the Internet provide access to a variety of data of all kinds which is communicated using a variety of network devices including servers, routers, hubs, switches, and other devices. Before placing a network, network device or application into use, testing to ensure successful operation and to identify limitations may be performed. Network devices may be tested, for example, to ensure that they function as intended, comply with supported protocols, and can withstand anticipated traffic demands.

To assist with the construction, installation and maintenance of networks, network devices and applications, networks may be augmented with network analyzing devices, network compliance systems, network monitoring devices, and network traffic generators, all which are referred to herein as network testing systems. The network testing systems may allow for the sending, capturing and/or analyzing of network communications.

Personal computers and workstations running software applications used to test networks, monitor networks, check network conformance, analyze networks, generate network and perform other network related tasks are not typically equipped with network devices, hardware and components which have the capabilities and features of network testing systems.

DESCRIPTION OF THE DRAWINGS

FIG. 5B is a flow chart of actions taken by a mirror client to remove a mirror device in accordance with the invention.

FIG. 6 is a flow chart of actions taken by a mirror server in accordance with the invention.

DETAILED DESCRIPTION

Throughout this description, the embodiments and examples shown should be considered as exemplars, rather than limitations on the disclosure.

The System

Figure 1:
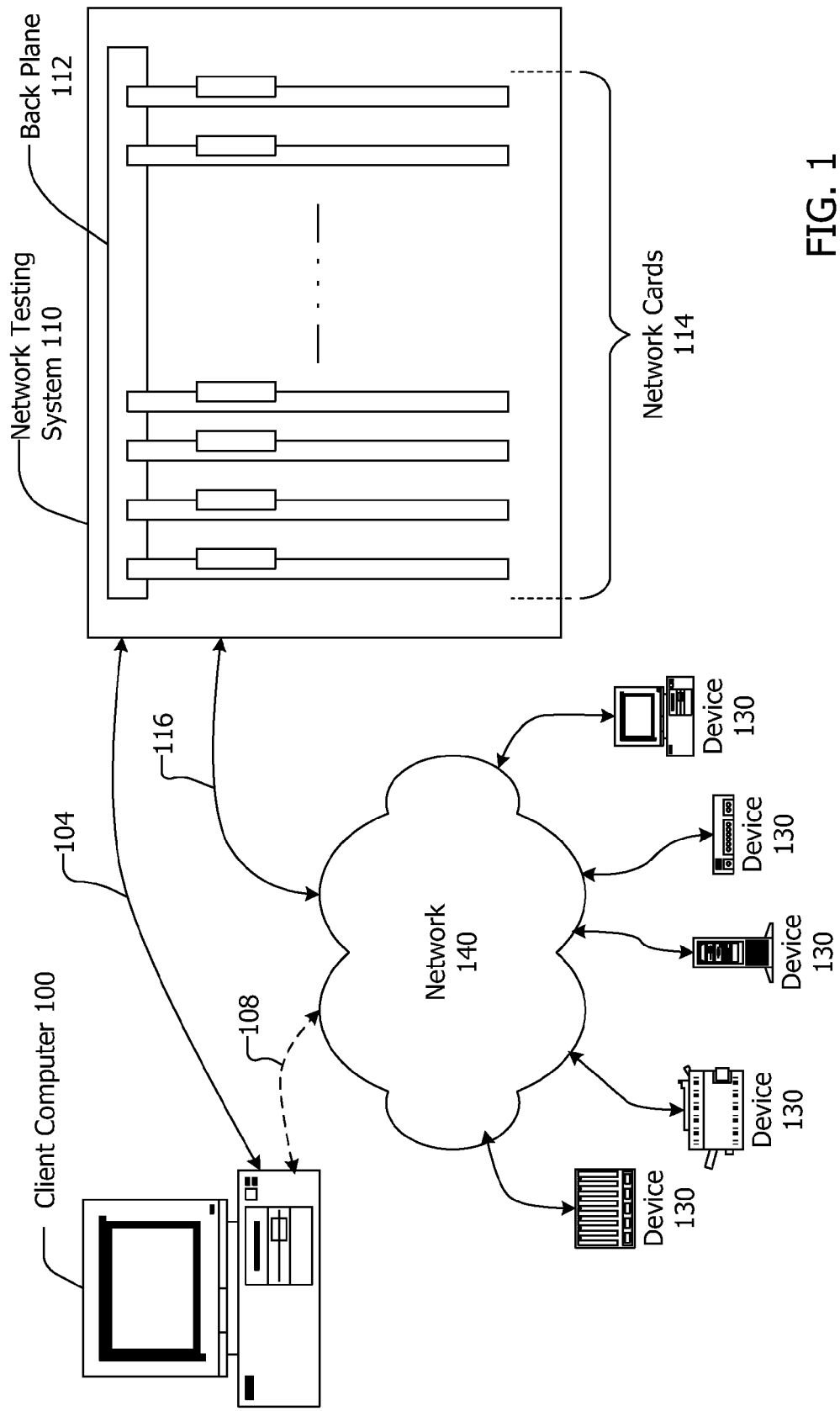
FIG. 1 is a block diagram of an environment in accordance with the invention.

Referring to FIG. 1, there is shown a block diagram of an environment in accordance with the invention. The environment includes a client computer 100, a network testing system 110, a connection 104, plural network capable devices 130, and a network 140.

The client computer 100 may include or be one or more of any computing devices such as computer workstations, personal computers, servers, portable computers, computing tablets, and the like. The client computer 100 is coupled to network testing system 110 via connection 104. The client computer 100 includes a network interface circuit which provides the client computer 100 the capability to communicate over a network or communication channel such as connection 104. Alternatively, client computer 100 may communicate with network testing system 110 via network 140 over network connections 108 and 116.

The client computer 100 may include a processor, a memory such as, for example, random access memory (RAM), and a storage device. The storage device may include a machine readable medium such as a hard disk, a CD-ROM, and other similar devices. The storage device may be one or more of a magnetic disk drive such as a hard disk drive, an optical disk drive such as a compact disk (CD) or digital versatile disk (DVD) reader/writer, and other similar devices.

The client computer 100 may include mirror client software stored permanently or temporarily in memory and/or on a storage device included therein. The client computer 100 may also include an operating system such as, for example, versions of Linux, Unix and Microsoft Windows. Alternatively, the mirror client functionality may be implemented on one or more hardware devices, and as a combination of hardware and software. The hardware devices include field programmable gate arrays (FPGA), application specific integrated circuits (ASIC), programmable logic devices (PLD), programmable logic arrays (PLA), processors and other kinds of devices.

The network testing system 110 may include or be one or more of a traffic generator, a performance analyzer, a conformance validation system, a network analyzer, a network management system, and/or others. The network testing system 110 may include a processor, a memory such as, for example, RAM and flash memory, and a storage device. The network testing system 110 may include one or more network cards 114 and a back plane 112. The network testing system 110 and/or one or more of the network cards 114 may be coupled to network 140 via network connection 116. Although only one network connection 116 is shown, two or more network connections may exist between the network testing system 110 and the network 140. The network testing system 110 may be in the form of a card rack, as shown in FIG. 1, or may be an integrated unit. Alternatively, the network testing system may comprise a number of separate units cooperating to provide traffic generation, traffic and/or network analysis, network conformance testing, and other tasks. Alternatively, the network testing system 110 may be a computer with one or more network cards included therein.

The network testing system 110 and the network cards 114 may support one or more well known communications standards or protocols such as, for example, the 10 Gigabit Ethernet standard, SONET, the Fibre Channel standards, and one or more varieties of the IEEE 802 Ethernet standards, may support proprietary protocols, and may support other protocols.

The term "network card" encompasses line cards, test cards, analysis cards, network line cards, load modules, interface cards, network interface cards, data interface cards, packet engine cards, service cards, smart cards, switch cards, relay access cards, and others. The network cards 114 may include one or more FPGAs, ASICs, PLDs, PLAs, processors and other kinds of devices. The network cards may include memory. In addition, the network cards 114 may include software and firmware.

Each network card 114 may include a circuit, chip or chip set that allows the network card 114 to communicate over a network as one or more network capable devices. A "network capable device" is any device that may communicate over network 140. The network cards 114 may be connected to the network through wire, optical fiber, wirelessly or otherwise. Each network card 114 may support a single communications protocol, may support a number of related protocols, or may support a number of unrelated protocols. The network cards 114 may be permanently installed in the network testing system 110, may be removable, or may be a combination thereof.

As described in more detail below, the network testing system 110 and/or each network card 114 may include mirror server software and/or be capable of executing mirror server software. Alternatively, the functionality of the mirror server may be implemented on network cards 114 as one or more FPGAs, ASICs, PLDs, PLAs, processors, flash memory, firmware and/or other kinds of devices.

The back plane 112 may serve as a bus or communications medium for the network cards 114. The back plane 112 may also provide power to the network cards 114.

The network capable devices 130 may be any devices capable of communicating over the network 140. The network capable devices 130 may be computing devices such as workstations, personal computers, servers, portable computers, personal digital assistants (PDAs), computing tablets, and the like; peripheral devices such as printers, scanners, facsimile machines and the like; network capable storage devices including disk drives such as network attached storage (NAS) and storage area network (SAN) devices; networking devices such as routers, relays, firewalls, hubs, switches, bridges, and multiplexers. In addition, the network capable devices 130 may include appliances such as refrigerators, washing machines, and the like as well as residential or commercial HVAC systems, alarm systems, and any other device or system capable of communicating over a network. The network capable devices 130 may be referred to as devices under test (DUTs).

The network 140 may be a local area network (LAN), a wide area network (WAN), a storage area network (SAN). The network 140 may be wired, wireless, or a combination of these, and may include or be the Internet. The network 140 may be public or private, and may be a segregated test network. Communications on the network 140 may take various forms, including frames, cells, datagrams, packets or other units of information, all of which are referred to herein as "data units". The network 140 may be comprised of numerous nodes providing numerous physical and logical paths for data to travel.

The connection 104 may be a private LAN, a private WAN, an Ethernet cable, or other wired or wireless connection. Alternatively, the connection 104 may be a direct connection such as, for example, via Universal Serial Bus (USB) and IEEE 1394 cables.

According to the techniques described herein, software on the client computer 100 may transparently access the capabilities, including features and functionality, of one or more network devices on network cards 114 in network testing system 110. That is, software on the client computer 100 may transparently use the mirror device as if it were a network device installed in the client computer. Capabilities include, for example, without limitation, added protocol support, increased speed (i.e., higher speed PHY or layer 1), increased throughput (i.e., processing capability), application support, and others. For example, the client may include a device such as a network interface card (NIC) which allows for network communication at speeds up to 100 Mbps, while the network testing system 110 may include network devices on network cards 114 which allow for communication at 10 Gbps. Capabilities also include allowing a client computer 100 located remote to the network testing system 110 to transparently access the network cards 114 to communicate with network devices 130 over network 140 as if the client computer 100 were local to the network devices 130.

According to the techniques described herein, a user of software on a client computer 100 may communicate over connection 104 to access the capabilities of a network device on network cards 114. The techniques may be used to test one or more devices 130 over network 140. Alternatively, a client computer 100 may communicate over network 140 with network devices in network cards 114 in network testing system 110 via network connections 108 and 116.

Figure 2:
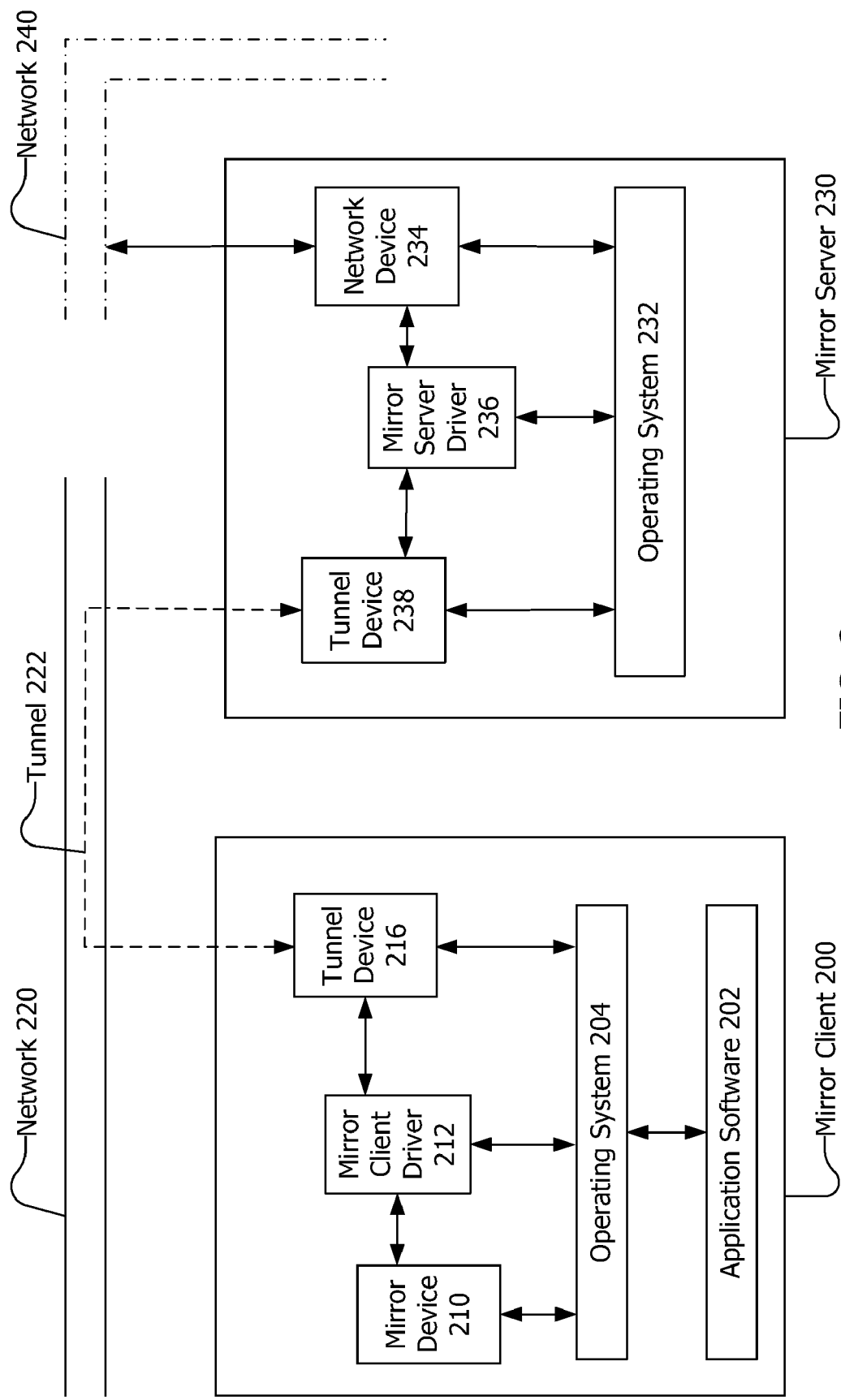
FIG. 2 is a block diagram of a system in accordance with the invention.

FIG. 2 is a block diagram of a system in accordance with the invention. A mirror client 200 and a mirror server 230 are coupled to one another via network 220. A mirror client 200 includes application software 202, operating system 204, mirror client driver 212, one or more mirror devices 210 and tunnel device 216. Mirror server 230 includes operating system 232, mirror server driver 236, tunnel device 238 and one or more network devices 234. The mirror server may access a network 240 via the network devices 234. The mirror client 200 may be a personal computer or workstation like client computer 100 shown in FIG. 1, and the mirror server may be a network testing system 110 or a network card 114 shown in FIG. 1. The network 220 may correspond to the connection 104 of FIG. 1, and the network 240 may correspond to the network 140 of FIG. 1

The application software 202 may be network testing software including software applications that allow a user to send, receive and/or analyze network traffic from the application layer down to the physical layer, and perform other network testing functions for network devices, network systems and/or network applications. The network traffic is comprised of data units. Alternatively, any upper layer software, that is, any software at layers two and above in the Open Systems Interconnection (OSI) model, may access the mirror device in addition to or in place of the application software 202. "Upper layer software" as used herein includes application programs, application layer software, network layer software, internet protocol (IP) software, session layer software, presentation layer software, and any software that is layer two and above.

The application software 202 on mirror client 200 may control, monitor and otherwise access the network device 234 on mirror server 230 through the local mirror device 210. All activity occurring on the network device 234 on mirror server 230 is mirrored in mirror device 210. This may be achieved by establishing a communication channel such as tunnel 222 over a network 220 that connects the mirror client 200 and the mirror server 230. Any incoming data units received by network device 234 are forwarded to mirror device 210, and any outgoing data units sent to mirror device 210 are forwarded to network device 234.

Mirror device 210 serves as a virtual interface to network device 234. Mirror device 210 is a virtual network device that exists solely in software. When network device 234 is a NIC, mirror device 210 serves as a virtual NIC. Similarly, when network device 234 includes one or more ports, one or more mirror devices 210 may provide a virtual interface to the ports on the network device 234. Additionally, multiple mirror devices on mirror client 200 may provide multiple virtual interfaces to network devices on multiple mirror servers which may be located geographically near to and/or far from the mirror client 200.

The mirror device 210 may be accessed by the application software 202 the same way the application software 202 traditionally accesses hardware (and software) devices. That is, the application software 202 may access the mirror device 210 via the operating system 204 in the same way any application would use operating system provided interfaces (such as procedure calls) to access any hardware (or software) device. Similarly, according to the virtual interface techniques described herein, any upper layer software may access the mirror device 210 in the same manner as the upper layer software accesses hardware and/or software devices included in mirror client 200.

Mirror device 210 may be created by using an operating system utility. The operating system 204 may maintain information about the mirror device 210 in a device list or other data structure, just as the operating system 204 maintains information about other devices accessible on the mirror client 200. The mirror device 210 may be accessed by IOCTL calls or other interface made available by the operating system.

The application software 202 may initiate outgoing data units from the mirror device 210. Mirror client driver 212 may provide the processing by which the mirror device 210 may send outgoing data units. Alternatively, rather than accessing the mirror device 210 through the operating system 204, the mirror client driver 212 may provide an application program interface (API) or programming interface in the form of one or more procedure calls, or other interface to the application software 202 or other upper layer software. Mirror client driver 212 formats the outgoing data unit according to any tunnel requirements, and sends outgoing data units via tunnel device 216 over tunnel 222 to mirror server 230. The outgoing data unit is received by tunnel device 238 and passed to mirror server driver 236 on network device 234. Mirror server driver 236 un-tunnels the data unit and communicates it onto the network 240 via network device 234.

The network device 234 may be a hardware device having a physical interface that allows for communications over network 240. The network device 234 may be a high speed NIC that allows for transmission speeds of 10 Gbps or more. The network device 234 may receive incoming data units from the network 240. The incoming data units may be tunneled from the network device 234 at the mirror server 230 to the mirror device 210 at the mirror client 200. The tunneling is performed by the mirror server driver 236 via the tunnel device 218. The mirror client driver 212 receives incoming data units via tunnel device 216 and un-tunnels them. The mirror client driver 212 passes the incoming data units to the application software 202 via the operating system 204.

The tunnel 222 may be formed between tunnel devices 216 and 238. Tunnel devices 216 and 218 may each be NICs. The tunnel 222 may be created using a transmission control protocol (TCP) socket. When using a TCP socket, the internet protocol (IP) addresses and the media access control (MAC) addresses of the tunnel devices 216 and 238 are used to specify the socket. Alternatively, a User Datagram Protocol (UDP) socket or other communication protocol construct may be used to form the communication channel over tunnel 222. Although communication between mirror client 200 and mirror server 232 is described herein as via tunnel 222 using sockets, data units may be passed between mirror client 200 and mirror server 232 using any kind of communication channel, including TCP and UDP sockets, ethernet, and any other communication technique or protocol, whether publicly known or proprietary.

A "mirror protocol" may be used for communication between the mirror client driver 212 and the mirror server driver 236. In general, the mirror protocol allows for the packaging and unpackaging of data units that are transferred across the tunnel 222 between the mirror client 200 and the mirror server 230. The mirror protocol may define a mirror protocol packet as having a header and a payload. The header may include a mirror protocol packet type, a mirror protocol version number, authentication information, and codes that may be used for increased control over the communications on the tunnel, as well as other fields. In one embodiment, the mirror protocol allows for five types of mirror protocol packets: query, response, report, error, and data. Also included in the header is the length of the payload in bytes (octets). The payload may be an incoming data unit received over the network 240 or an outgoing data unit to be sent on to the network 240. The payload may also contain other data originating from the mirror client driver 212 or the mirror server driver 236 which corresponds to the mirror protocol packet type.

Although communications between mirror client 200 and mirror server 232 are described herein as via tunnel 222 between tunnel devices 216 and 238 which may be NICs, alternatively, other communication channels and devices may be used. For example, the tunnel devices may be USB or IEEE 1394 interfaces and the communication channel may be a USB or IEEE 1394 communication line. The communication channel may be formed over Ethernet, SONET or Fibre Channel, and others. In addition, a mirror client and a mirror server may communicate over network 240 via network connections like those depicted as network connections 108 and 116 in FIG. 1.

Figure 3:
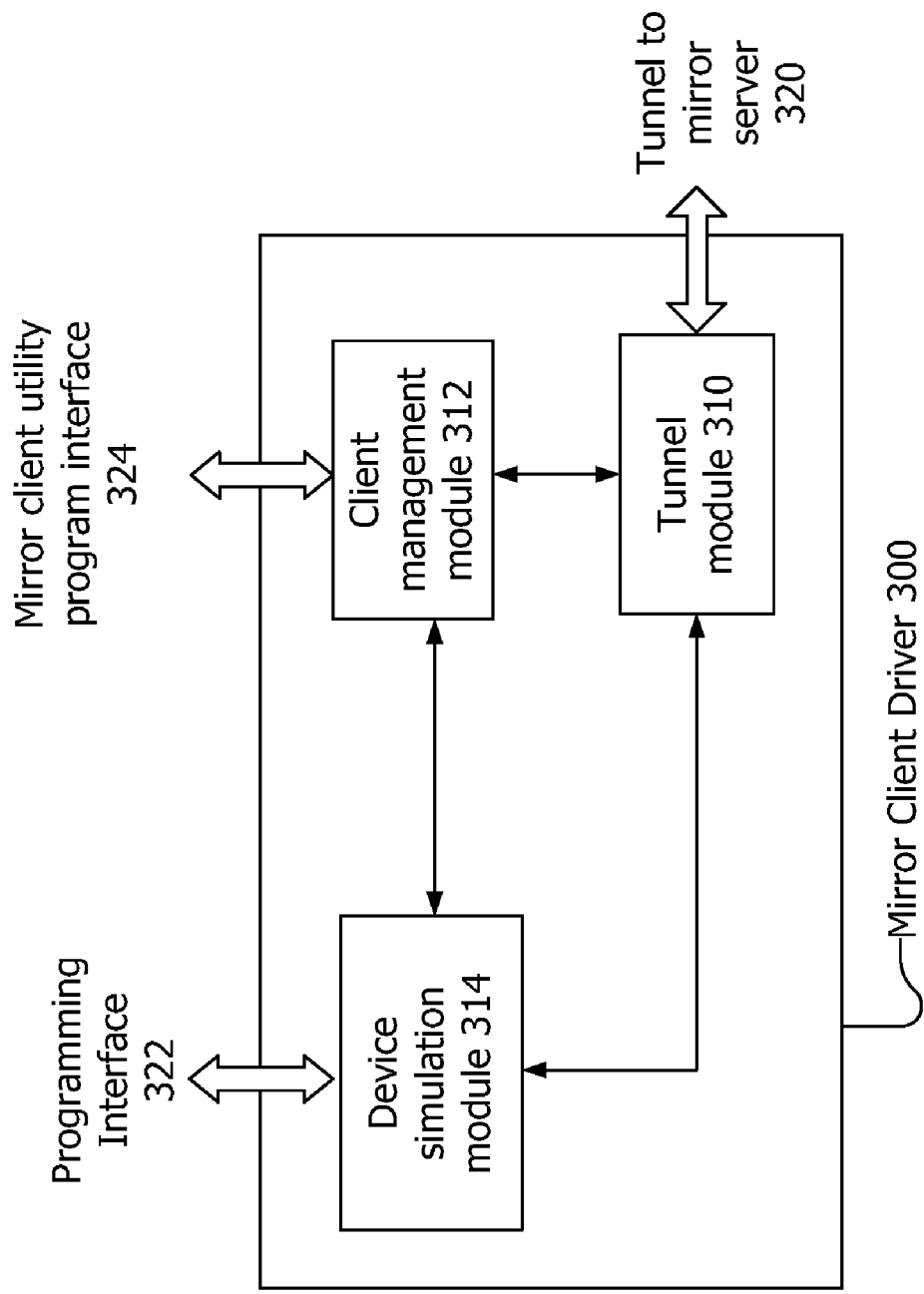
FIG. 3 is a block diagram of a client driver in accordance with the invention.

FIG. 3 is a block diagram of a mirror client driver 300 in accordance with the invention. The mirror client driver 300 may include a tunnel module 310, a client management module 312, and a device simulation module 314. Although three module are discussed and shown, more and fewer modules may be included to achieve the functionality of the mirror client driver 300.

The tunnel module 310 is used to create the tunnel 320, to close the tunnel 320, and to manage the exchange of data to and from the mirror client driver 300. The exchange of data may be achieved using the mirror protocol discussed above. The tunnel module 310 allows for establishing a tunnel, in one embodiment, opening a socket, with the mirror server; sending mirror protocol packets to the mirror server; receiving mirror protocol packets from the mirror server; and closing the connection with the mirror server.

The device simulation module 314 allows for the creation, deletion, and other control of mirror devices, such as mirror device 210 shown in FIG. 2. The device simulation module 314 receives device creation/deletion instructions from the client management module 312. The device simulation module 314 also receives incoming data units data from the tunnel module 310 and makes the incoming data units available to application programs via, in one embodiment, a programming interface 322. The device simulation module 314 provides the programming interface 322 to upper layer software. The device simulation module 314 may conform to rules for device drivers defined by an operating system on a client computer. The device simulation module 314 processes requests for information about a specific network device on the mirror server, and processes requests to send outgoing data units via a specific network device on the mirror server.

The client management module 312 receives requests from upper layer software via the device simulation module 314 and manages tunnel related operations via the tunnel module 310. The client management module 312 provides a mirror client utility program interface 324 which is used to create and delete the mirror devices. The client management module 312 maps and maintains mapping information regarding the tunnels and associated mirror devices, network devices on the mirror server, and/or network interfaces to the network devices on the mirror server, as well as other pertinent tunnel information. The mapping information may be stored as a connection information base.

Figure 4:
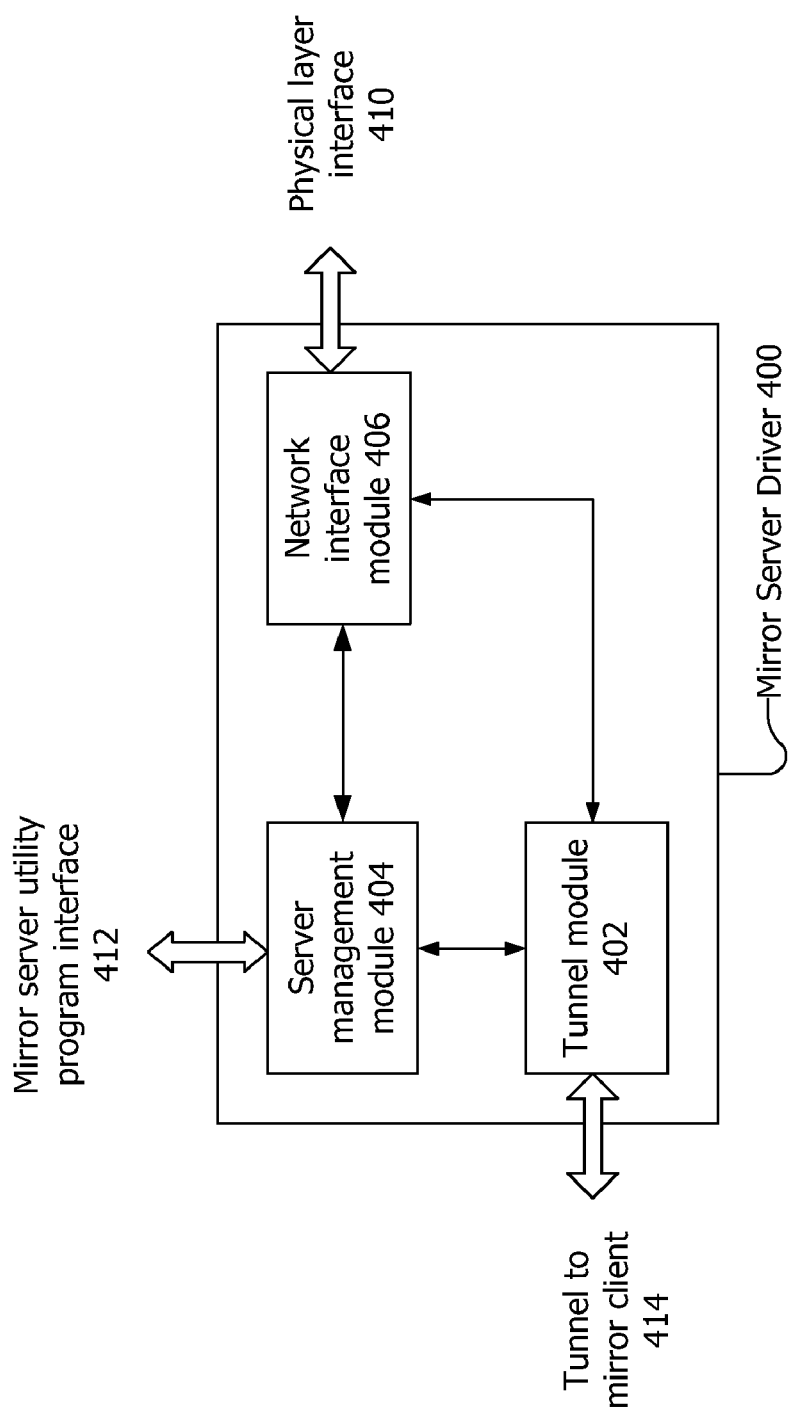
FIG. 4 is a block diagram of a server driver in accordance with the invention.

FIG. 4 is a block diagram of a mirror server driver 400 in accordance with the invention. The mirror server driver 400 maintains information for the tunnels between the mirror server and the mirror client, manages communications with the mirror devices over the tunnel, receives and processes incoming data units from the network, and receives and processes requests from the mirror client received over the tunnel. The mirror server driver 400 may consist of a tunnel module 402, a network interface module 406, and a server management module 404.

The tunnel module 402 creates and closes tunnels based on requests received via the server management module 404. The tunnel module 402 exchanges mirror protocol packets with the mirror client according to the mirror protocol. The mirror protocol packets are exchanged between the mirror client and the mirror server over the tunnel to the mirror client 414. The tunnel module 402 provides an interface to the server management module 404 to allow a server utility program resident on the mirror server to create a tunnel by, in one embodiment, opening a socket. The tunnel module 402 accepts connections from the mirror client, sends mirror protocol packets over the tunnel to the mirror client, and receives mirror protocol packets over the tunnel from the mirror client.

The network interface module 406 allows for the receipt of incoming data units over a network and sending outgoing data units over the network. The network interface module 406 receives incoming data units over a physical layer interface 410 with the network, and sends the incoming data units to the corresponding mirror device on the mirror client via the tunnel module 402. Information to be passed from a mirror device to a network device is received via the tunnel module 402 and directed to the network interface module 406.

The server management module 404 receives requests from the application software or other upper layer software on the mirror client via tunnel module 402, manages tunnel related operations via tunnel module 402, and communicates with the network interface module 406. The requests may also originate from the mirror device on the mirror client. The server management module 404 maintains mapping information regarding the various network interfaces and corresponding tunnels, which may be, in one embodiment, sockets. The server management module 404 also receives tunnel creation instructions, tunnel deletion instructions, other instructions, and other queries from a server utility program via a server utility program interface 412.

The client management module 312 on the mirror client and the server management module 404 on the mirror server cooperatively manage the tunnel which allows a mirror device on the mirror client to mirror a network device on the mirror server.

The Methods

Figure 5A:
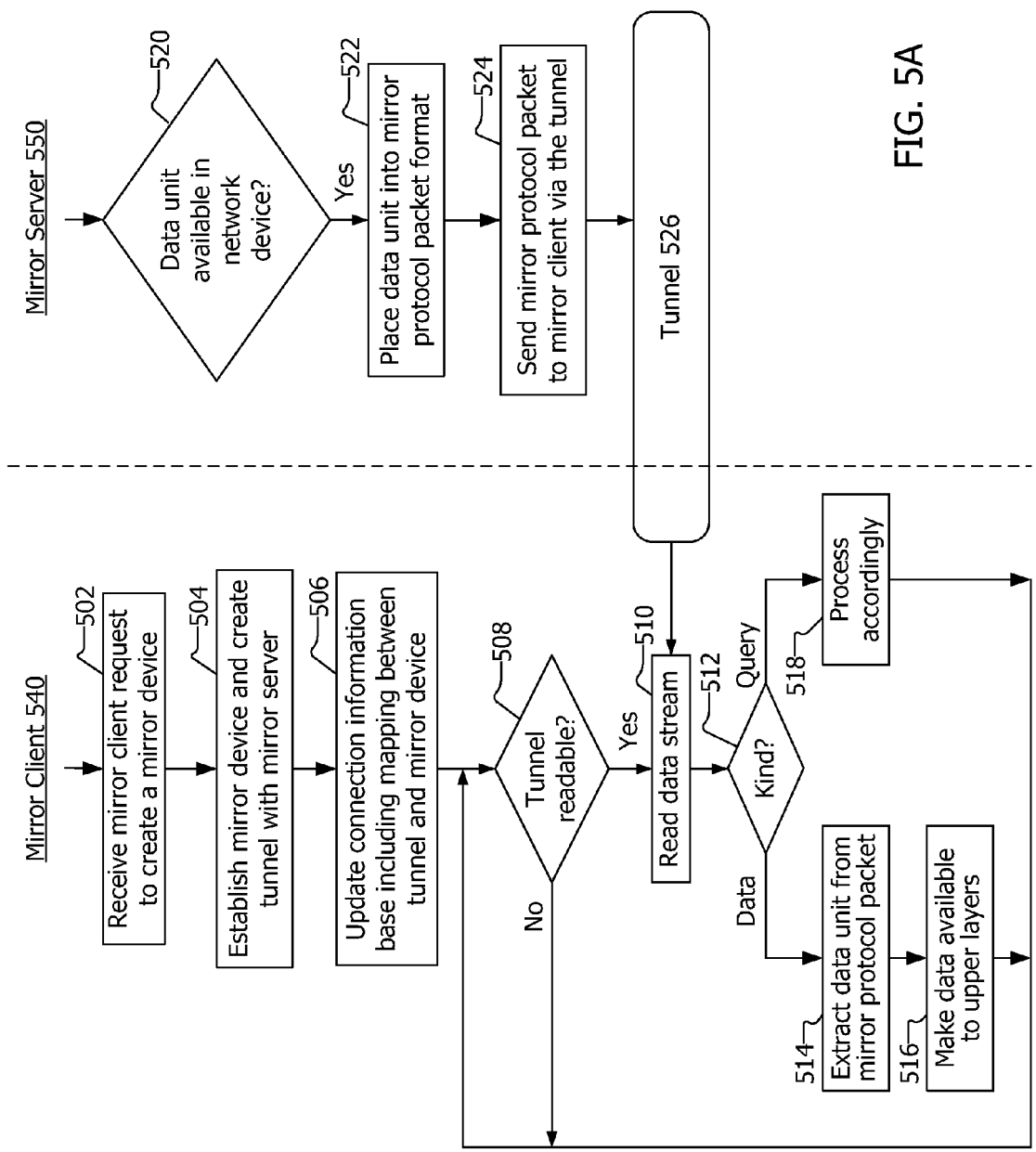
FIG. 5A is a flow chart of actions taken by a mirror client and a mirror server in accordance with the invention.

FIG. 5A is a flow chart of actions taken by a mirror client and a mirror server in accordance with the invention. A mirror device is created on the mirror client. This may be achieved by running a mirror client utility to create the mirror device. The mirror client utility may be an application program or an operating system utility. The mirror client utility may require arguments such as the network (e.g., IP) address of the network interfaces of the network devices on the mirror server, a port designation on the network device, a name to correspond to the mirror device created, and others.

The mirror client receives the mirror device creation request, as shown in block 502. A mirror device is created and a tunnel connection is established with the specified mirror server, as shown in block 504. This may be achieved by using a socket. If the attempt to establish the connection is unsuccessful, an error code is returned. If the tunnel is successfully created, the mirror client updates a connection information base that includes information about the established mirror devices and mappings of the tunnel and associated network device with a mirror device, as shown in block 506. The connection information base may be in any format or data structure, including, in one embodiment, a linked list of tunnel/mirror device mappings.

A check may be made to determine whether the tunnel is readable, as shown in block 508. This may be achieved by listening on a socket or waiting for data from the tunnel. If the tunnel is readable, there is a mirror protocol packet available via the tunnel 525, and the data stream from the tunnel 526 is read, as shown in block 510.

The mirror protocol packet is evaluated to determine what kind of mirror protocol packet has been received, as shown in block 512. The mirror protocol packet may contain a data unit received from the mirror server 550 over a network or other data. If the kind of mirror protocol packet is "data", the data unit in the mirror protocol packet is extracted, as shown in block 514. The data from the data unit is made available to upper layer software in the mirror client 540, as shown in block 516. In one embodiment, the data and/or the data unit is made available to a network layer via a procedure call interface. In some embodiments, queues, mailboxes, data registers, and other techniques may be used to made the data and/or the data unit to available to upper layer software.

The mirror protocol packet may contain a query for information about the mirror device or the mirror client. In response to a query, the mirror client 540 processes the query accordingly based on the particular query, as shown in block 518. This may be achieved by the mirror client driver providing requested information to the mirror server 550 or to one or more network interfaces associated with a network device included in the mirror server 550. The mirror client 540 uses the tunnel 526 to communicate any response to the query to the mirror server 550 or to one or more network interfaces associated with network devices accessible via the mirror server 550.

The mirror protocol packets received by mirror client 540 may also contain control and status information. The control and status information may include information about the status of the tunnel, configuration information concerning the network device emulated by the mirror device, status information regarding a network interface and/or a network device on the mirror server 550, and other information.

The flow of actions from blocks 516 and 518 continues with a return to decision block 508 where further communications from the tunnel 526 are read, which, in one embodiment, may be achieved by accessing an appropriate socket.

In addition to receiving a request to create a mirror device, the mirror client may also receive a request to remove a mirror device. A single utility program may be used to create and remove mirror devices. Arguments provided to the utility program may control its functionality. Alternatively, separate programs may be provided which allow for the creation and removal of mirror devices.

FIG. 5B is a flow chart of actions taken by a mirror client to remove a mirror device in accordance with the invention. To remove a mirror device, the client utility program may be called with appropriate arguments. The arguments identify the mirror device to be removed. The mirror device may be identified by one or more of a tunnel name or identifier, a socket number, an interface name, an interface identifier, a device name, and other techniques. The mirror client receives the mirror device removal request, as shown in block 530. The tunnel associated with the mirror device is closed, as shown in block 532, and the mirror device is removed from the operating system device list, as shown in block 534. This may be achieved via an operating system provided procedure or interface, such as for example, an IOCTL call. The connection information base is updated to remove the mirror device, the tunnel, the mapping of the network interface and the tunnel with the mirror device, and any associated interfaces, as shown in block 536.

FIG. 6 is a flow chart of actions taken by a mirror server in accordance with the invention. The mirror server may receive a request from a server utility program, as shown in block 610. The actions taken by the mirror server are dependent on the kind of request. A check for the kind of request is made, as shown in block 612. The kind of request may be to start a communication tunnel to one or more network interfaces associated with a network device, as shown in block 620; to register one or more network interfaces associated with a network device as available for mirroring, as shown in block 630; to unregister a network interface to a network device from the mirroring system, as shown in block 640; and to end all mirroring regarding all network interfaces to all network devices, as shown in block 650. In alternative embodiments, the functionality of processing of each kind of request and the kinds of requests may be combined, further delineated or expanded.

When the server utility program request specifies that a tunnel to a network interface should be started, as shown in block 620, the request may include arguments such as one or more of the network (e.g., IP address) of the network device or network interface, the network address of the mirror server, a tunnel, port or socket designation or identifier, and/or others. A list of network interfaces to be added to the server interface database may also be specified. The server utility program request may use an operating system procedure or utility such as an IOCTL to communicate the start request. The server management module may communicate with the driver module to implement the server utility program start request.

When a start request and associated arguments are received, a server interface database mapping the network interfaces to corresponding tunnels is updated, as shown in block 622. The tunnel may be a socket. A well known protocol such as TCP may be used to communicate over the tunnel. The server interface database may be used to maintain a list of all tunnels, and, in some embodiments, sockets, which have been created and their corresponding network interfaces. The specified tunnel is opened and is bound to the specified network address, as shown in block 624. The mirror server then listens on the tunnel for mirror protocol packets from the mirror client, as shown in block 626. A thread may be created via the operating system. The thread may be used to process information received from the tunnel and/or monitor the tunnel. One thread may be used by the mirror server driver, or multiple threads may be used by the mirror server driver.

When the server utility program request specifies that a network interface should be registered or unregistered, the request may include arguments such as the port or socket designation of the network interface or the network device, and a list of identifiers of network interfaces to be added to the server interface database. In those implementations in which there is only one network device, one network interface or one port, then the port, network device identifier, network interface identifier or other designation regarding the network device need not be included.

When the server utility program request specifies that a network interface to a network device should be registered, as shown in block 630, the network interface is added to the server interface database mapped to a network device and/or port on the network device, as shown in block 632.

When the server utility program request specifies that a network interface should be unregistered, as shown in block 640, a notification is sent to the mirror client that the specified network interface no longer exists, as shown in block 642. This may be achieved by sending an appropriate mirror protocol packet over the tunnel. The tunnel, and, in one embodiment, any socket, associated with the interface is closed, as shown in block 644. The server interface database is updated, removing the specified network interface, as shown in block 646. Other data related to the specified network device may also be removed from the server interface database.

When the server utility program request specifies to end, as shown in block 650, a notification is sent to the mirror client that all network interfaces no longer exist, as shown in block 652. This may be achieved by sending an appropriate mirror protocol packet over the tunnel. All tunnels, including, in some embodiments, all TCP connections/sockets, are closed, as shown in block 654. The server interface database is cleared, removing all network interfaces and any corresponding tunnel (and any socket) mappings, as shown in block 656. If one or more threads were created to manage the mirror server functionality, the one or more threads are deleted.

Figure 7:
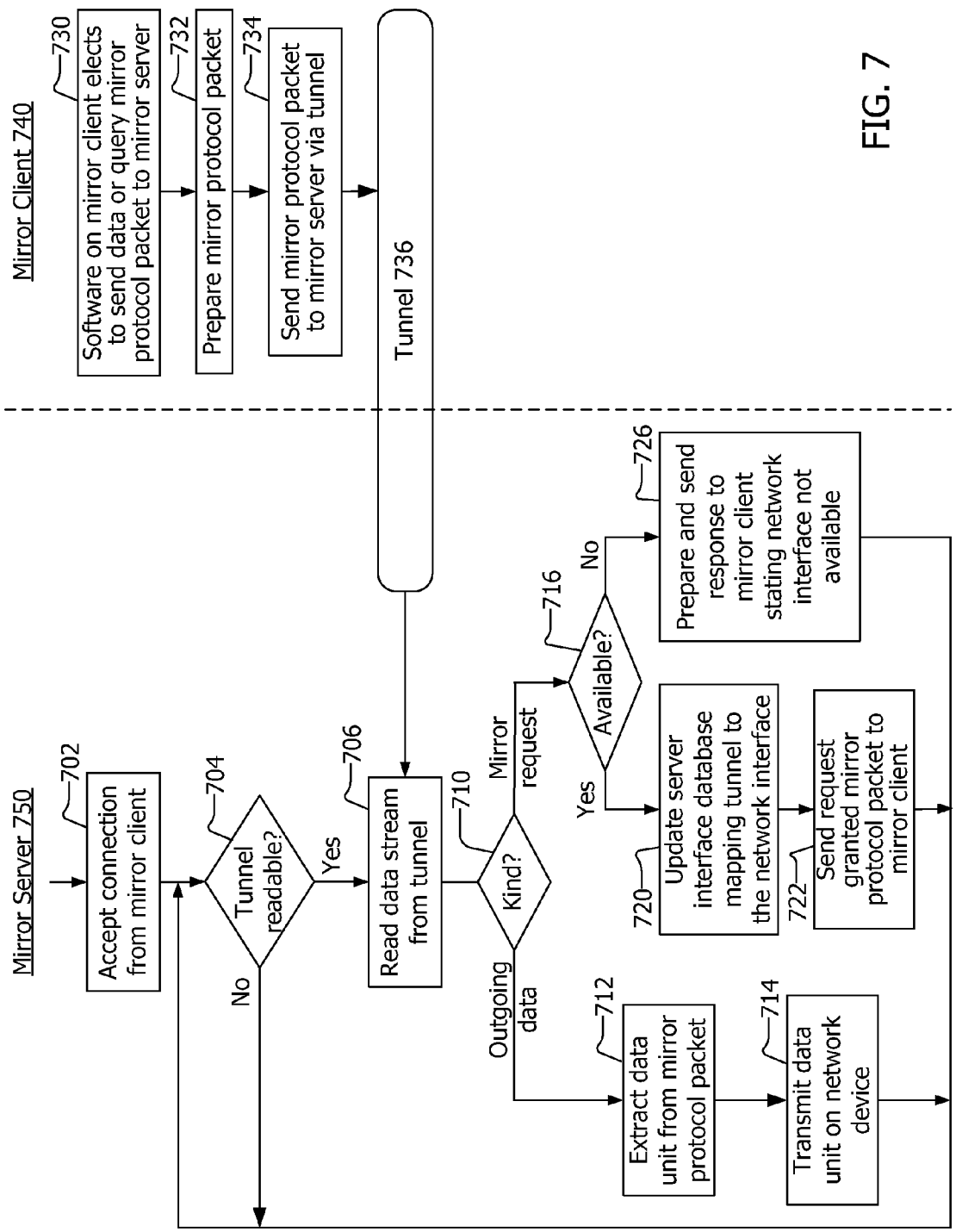
FIG. 7 is a flow chart of further actions taken by a mirror client and a mirror server in accordance with the invention.

FIG. 7 is a flow chart of further actions taken by a mirror client and a mirror server in accordance with the invention. The mirror server accepts a connection from a mirror client, as shown in block 702. The mirror server then waits on the tunnel associated with the connection. A check is made to determine if the tunnel is readable, as shown in block 704. That is, a check is made to determine if there is a mirror protocol packet in the tunnel 736. This may be achieved by waiting on a TCP socket.

For the socket to be readable, the mirror client 740 will have sent a mirror protocol packet to the mirror server via tunnel 736, as shown in block 734. Software on the mirror client elects to send a mirror protocol packet including a data unit or a query to the mirror server 750, as shown in block 730. The query may be a query for the availability of a network device or network interface to be mirrored. The mirror client prepares the mirror protocol packet, as shown in block 732. The mirror client 740 then sends the mirror protocol packet to the mirror server 750 via tunnel 736, as shown in block 734.

Continuing with activity on the mirror server 750, if the tunnel is readable, as shown in block 704, the data stream from the tunnel 736 is read, as shown in block 706. A check is made to determine the kind of mirror protocol packet read from the tunnel 736, as shown in block 710. The kind of mirror protocol packet may be an outgoing data unit or a query in the form of an mirror request. Other mirror protocol packets may also be checked for and handled appropriately.

If the mirror protocol packet includes an outgoing data unit to be sent on the network interface, the outgoing data unit is extracted from the mirror protocol packet, as shown in block 712. Alternatively, the outgoing packet may be assembled or constructed according to parameters specified in the mirror protocol packet. The outgoing data unit is then transmitted via the network device associated with the network interface, as shown in block 714.

If the kind of mirror protocol packet is a query in the form of mirror request, as shown in block 710, a check is made to determine the availability of the specified network interface, as shown in block 716. If the network interface is available, the connection information base is updated, such that an entry mapping the tunnel and its associated network interface with the corresponding mirror client virtual interface is added, as shown in block 720. A request granted mirror protocol packet may then be sent to the mirror client over tunnel 736, as shown in block 722. If the network device and/or the network interface to the network device is not available, the mirror server prepares and sends a response to the mirror client. The response is sent over the tunnel 736 in the form of a mirror protocol packet stating the network interface to the network device is not available, as shown in block 726.

Although exemplary embodiments of the invention have been shown and described, it will be apparent to those having ordinary skill in the art that a number of changes, modifications, or alterations to the systems and methods described herein may be made. All such changes, modifications and alterations should therefore be seen as within the scope of the disclosure.

It is claimed:

1. A network testing system coupled to a first network, the network testing system having a hardware network device included therein, the network device coupled to a second network, the network testing system including software which when executed causes the network testing system to perform operations comprising:
   the network testing system establishing a communication channel to a client computing device on the first network through the hardware network device
   the network testing system receiving a mirror request from the client computing device over the communication channel on the first network, the mirror request specifying the hardware network device
   the network testing system sending a request granted packet to the client computing device over the communication channel on the first network
   the network testing system accepting a connection request from the client computing device over the communication channel on the first network,
   the network testing system providing the client computing device access to capabilities of the hardware network device of the network testing system, including:
      the network testing system forwarding to the client computing device via the communication channel incoming data units received by the hardware network device over the second network, the incoming data units specifying the hardware network device as a destination
      the network testing system receiving from the client computing device via the communication channel outgoing data unit requests to send outgoing data units onto the second network via the hardware network device according to at least one of the following
         using a protocol not supported by the client computing device,
         accessing application support not available at the client computing device, and/or
         at a throughput not possible at the client computing device, the outgoing data unit requests including packet assembly parameters.

2. The network testing system of claim 1 wherein the communication channel is a tunnel.

3. The network testing system of claim 2 wherein the client computing device includes a first tunnel device and the network testing system includes a second tunnel device, the tunnel established between the first tunnel device and the second tunnel device.

4. The network testing system of claim 3 wherein the first tunnel device and the second tunnel device are each network interface devices.

5. A network testing system comprising:
   at least one network device, the network testing system coupled to a first network, each network device coupled to a second network, each network device having at least one network interface associated therewith, the network testing system including software which when executed causes the network testing system to perform operations comprising:
      the network testing system establishing a communication channel to a client computing device on the first network through a first network device of the at least one network device
      the network testing system receiving a mirror request from the client computing device over the communication channel on the first network, the mirror request specifying the first network device
      the network testing system sending a request granted packet to the client computing device over the communication channel
      the network testing system accepting a network interface connection request from the client computing device over a communication channel on the first network, the network interface connection request including a specified network interface of the first network device, the connection request causing the network testing system to wait on the communication channel for additional requests from the client computing device
      the network testing system providing the client computing device access to capabilities of the first network device of the network testing system via the specified network interface, including
         the network testing system forwarding to the client computing device via the communication channel incoming data units received by the specified network interface over the second network, the incoming data units specifying the first network device as a destination
         the network testing system receiving from the client computing device via the communication channel outgoing data unit requests to send outgoing data units onto the second network via the specified network interface according to at least one of
            using a protocol not supported by the client computing device,
            accessing application support not available at the client computing device, and/or at a throughput not possible at the client computing device.

6. The network testing system of claim 5 wherein the client computing device includes a first communication device and the network testing system includes a second communication device, the communication channel established between the first communication device and the second communication device.

7. The network testing system of claim 6 wherein the first communication device and the second communication device are each network interface devices.

8. The network testing system of claim 5 wherein the first network is an Ethernet network.

9. A method for allowing a client computing device to access capabilities of a network device included in a network testing system via a virtual interface, the method comprising:
the network testing system processing establishing a communication channel to the client computing device on a first network through the network device
the network testing system receiving a mirror request from the client computing device over the communication channel on the first network, the mirror request specifying the network device
the network testing system sending a request granted packet to the client computing device over the communication channel
the network testing system accepting a connection over the communication channel from the client computing device
the network testing system associating a network interface of the network device with the communication channel
the network testing system providing the client computing device access to capabilities of the network device of the network testing system via the network interface, including
the network testing system receiving via the communication channel outgoing data unit requests from the client computing device, the outgoing data unit requests including an identifier of a specified network interface
the network testing system transmitting outgoing data units pursuant to the outgoing data unit requests onto a second network via the specified network interface according to at least one of
using a protocol not supported by the client computing device,
accessing application support not available at the client computing device, and/or
at a throughput not possible at the client computing device.

10. The method of claim 9 wherein the establishing the communication channel includes using a transmission control protocol (TCP) socket to create a tunnel.

11. The method of claim 9 further comprising:
the network testing system receiving over the second network incoming data units directed to the network interface of the network device
the network testing system forwarding the incoming data units to the client computing device via the communication channel.

12. A network testing system having a processor, a memory, an operating system, and at least one network card, the processor to execute instructions stored in the memory to cause the network testing system to perform operations comprising:

the network testing system processing establishing a communication channel to a client computing device on a first network through a network device included in one of the network cards
the network testing system receiving a mirror request from the client computing device over the communication channel on the first network, the mirror request specifying the network device
the network testing system sending a request granted packet to the client computing device over the communication channel
the network testing system accepting a connection over the communication channel with the client computing device
the network testing system associating a network interface of the network device with the communication channel
the network testing system providing the client computing device access to capabilities of the network device of the network testing system via the network interface, including:
the network testing system receiving via the communication channel outgoing data unit requests from the computing device, the outgoing data unit requests including an identifier of the network interface associated with the network device
the network testing system transmitting outgoing data units pursuant to the outgoing data unit requests onto a second network via the network interface according to at least one of
using a protocol not supported by the client computing device,
accessing application support not available at the client computing device, and/or
at a throughput not possible at the client computing device
the network testing system receiving over the second network incoming data units directed to the network interface of the network device
the network testing system forwarding the incoming data units to the client computing device via the communication channel.

13. The network testing system of claim 12 wherein the opening the communication channel includes using a transmission control protocol (TCP) socket to create a tunnel.

14. The network testing system of claim 12 performing further operations comprising:
the network testing system receiving over the second network incoming data units directed to the network interface of the network device
the network testing system forwarding the incoming data units to the client computing device via the communication channel.

15. A machine readable storage device having instructions stored thereon which when executed by a processor in a network testing system cause a network card in the network testing system to perform operations comprising
the network card establishing a communication channel to a client computing device on a first network through a network device included in the network card
the network card receiving a mirror request from the client computing device over the communication channel on the first network, the mirror request specifying the network device
the network card sending a request granted packet to the client computing device over the communication channel the network card accepting a connection over the communication channel over the first network with the client computing device the network card associating a network interface of the network device included in the network card with the communication channel the network card providing the client computing device access to capabilities of the network device of the network card in the network testing system via the network interface, including:

the network card receiving via the communication channel outgoing data unit requests from the computing device, the outgoing data unit requests including an identifier of the network interface associated with the network device included in the network card the network card transmitting outgoing data units pursuant to the outgoing data unit requests onto a second network via the network interface according to at least one of using a protocol not supported by the client computing device, accessing application support not available at the client computing device, and/or at a throughput not possible at the client computing device.

16. The machine readable storage device of claim 15 wherein the establishing the communication channel includes using a transmission control protocol (TCP) socket to create a tunnel.

17. The machine readable storage device of claim 16 having further instructions stored thereon which when executed cause the network testing system to perform additional actions comprising:

the network card receiving over the second network incoming data units directed to the network interface of the network device the network card forwarding the incoming data units to the client computing device via the communication channel.

\* \* \* \* \*